March 1, 1966  L. J. DAMASCO, SR  3,237,666
APPARATUS FOR INCREASING THE TRACTIVE EFFECT OF A TIRE
Filed Jan. 21, 1965  4 Sheets-Sheet 2
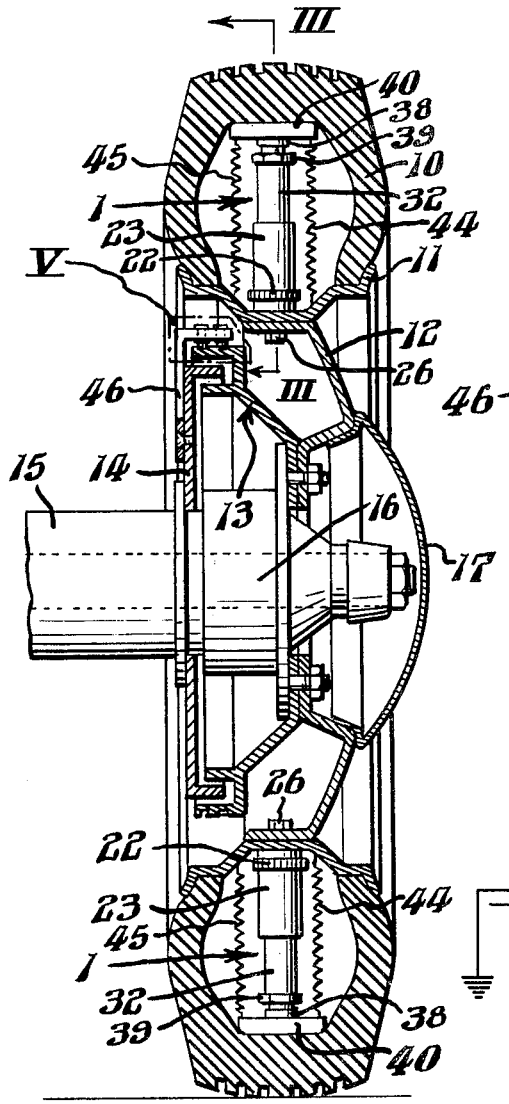
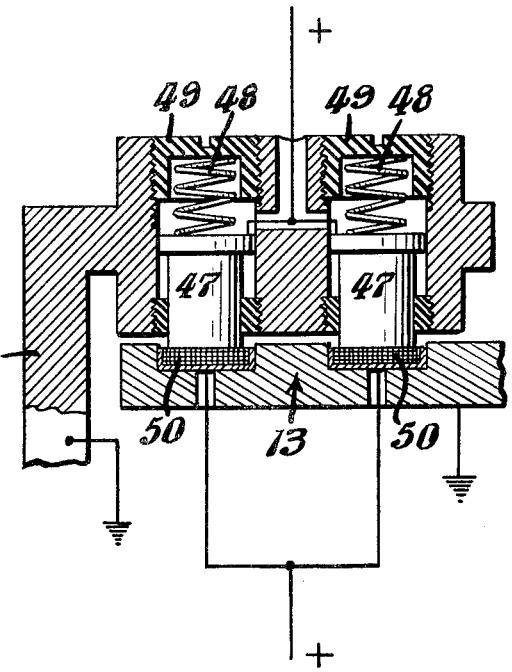
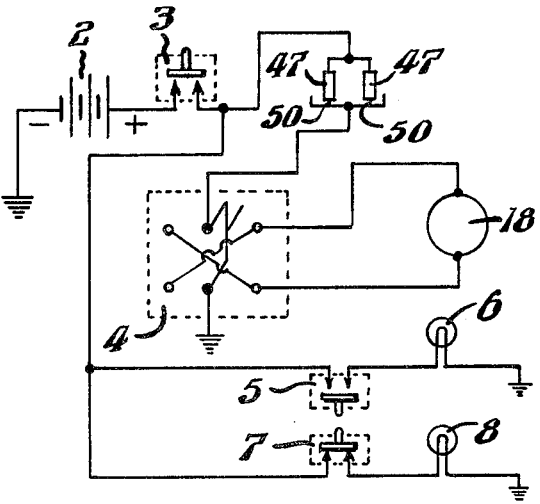
INVENTOR.
Louis J. Damasco, Sr.
BY
Paul & Paul
ATTORNEYS.

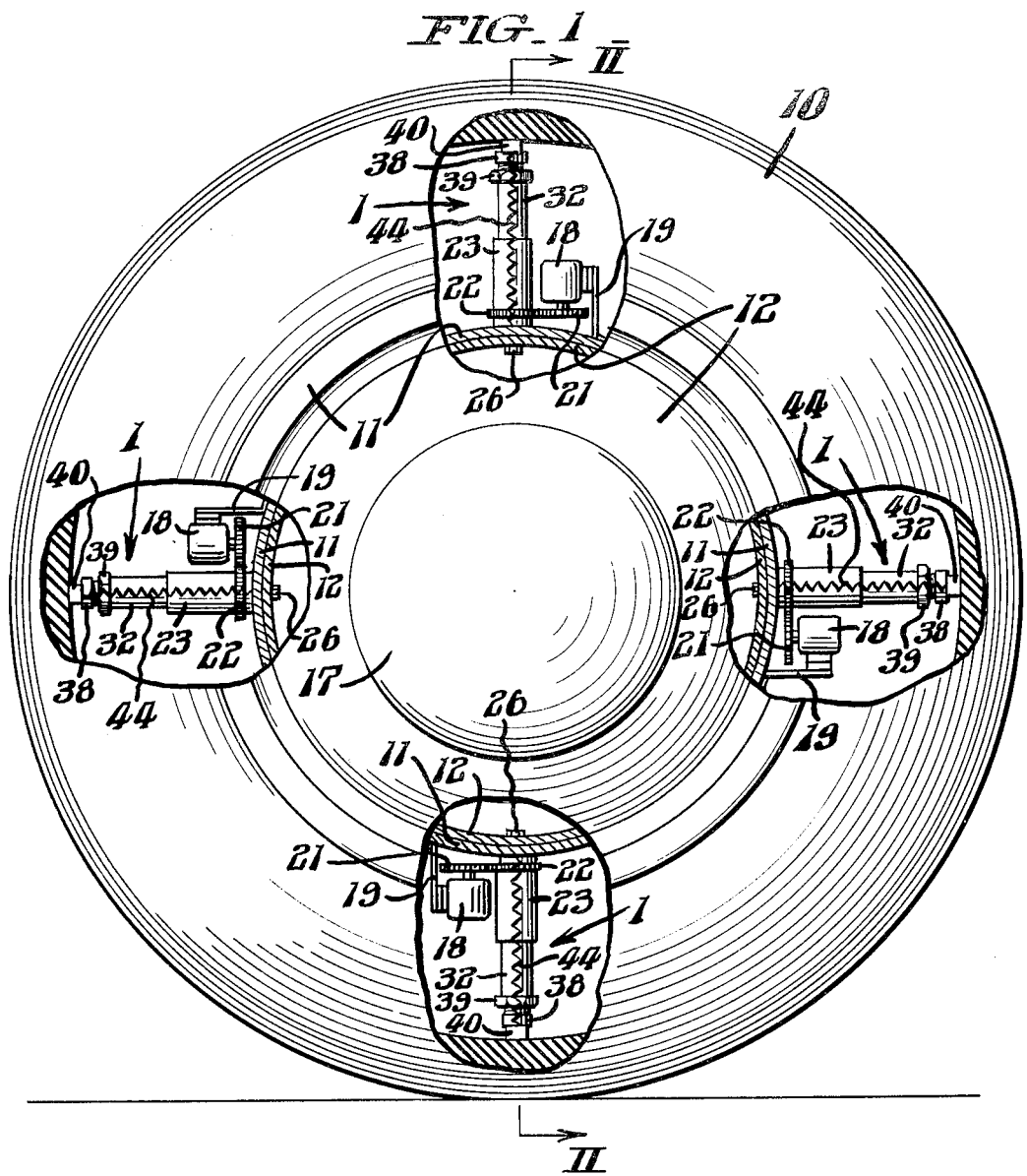

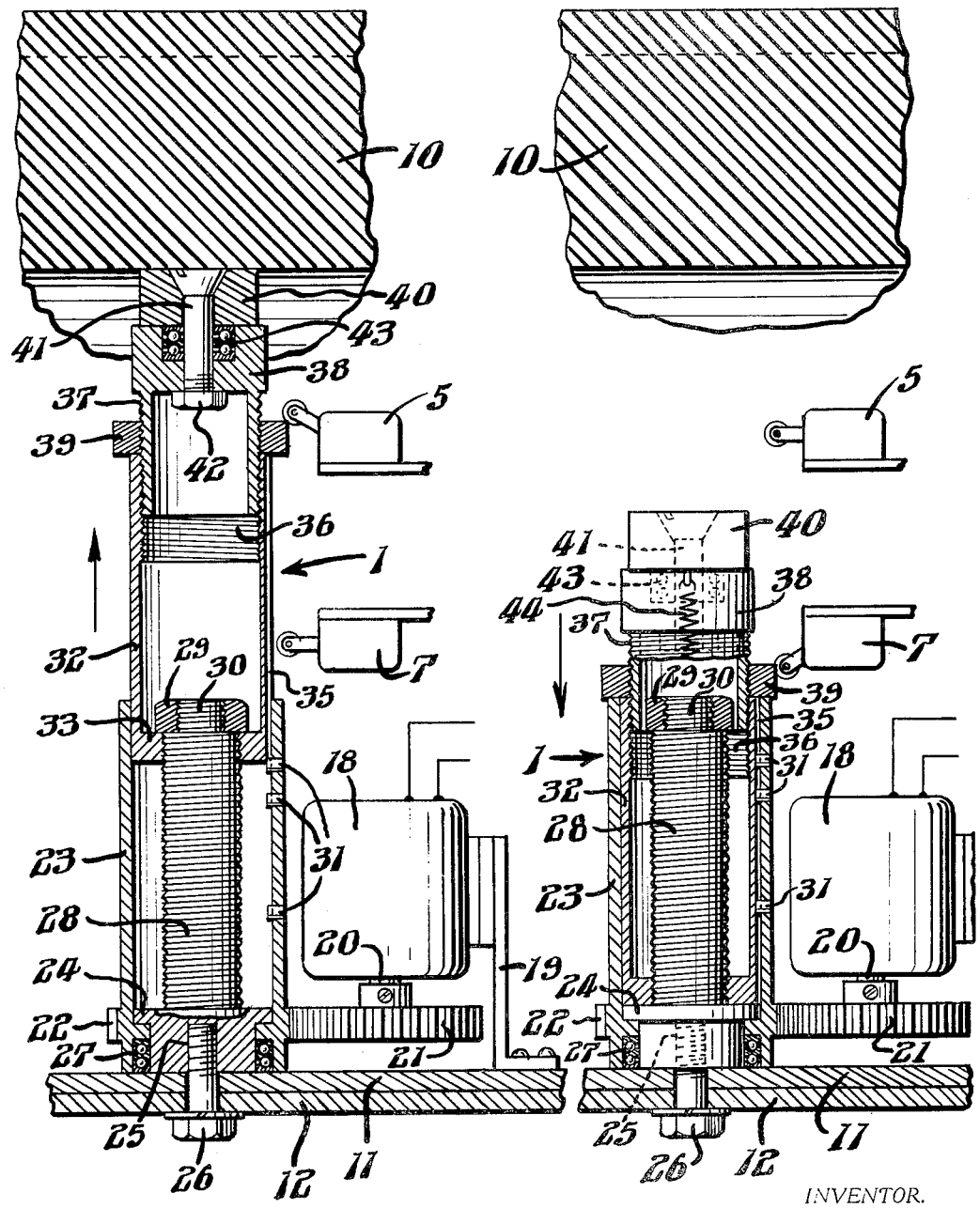

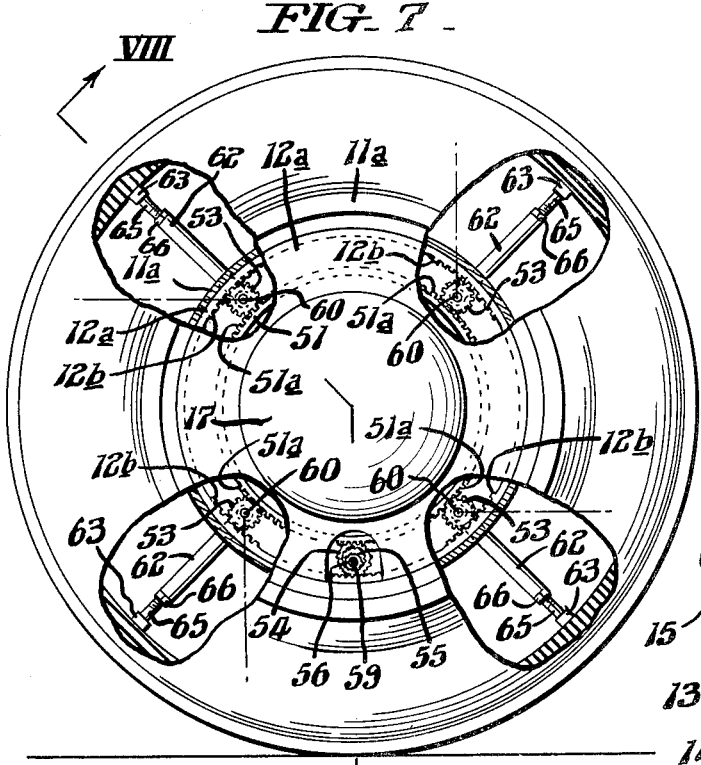
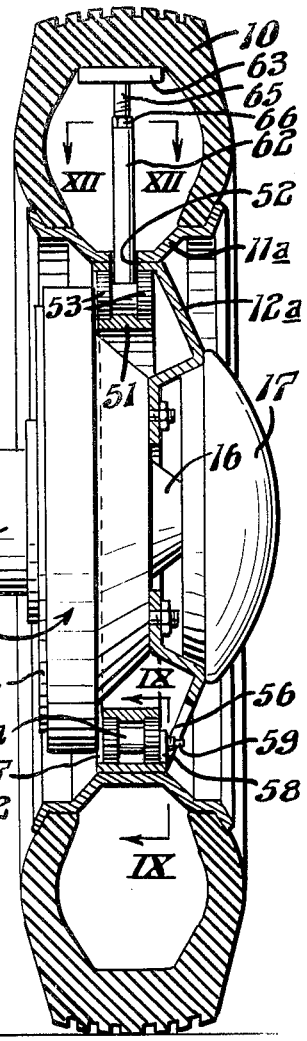
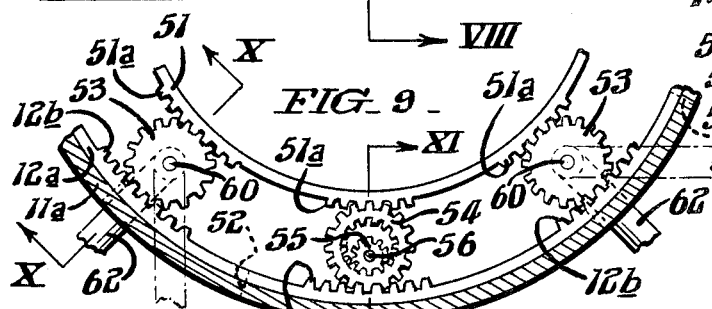
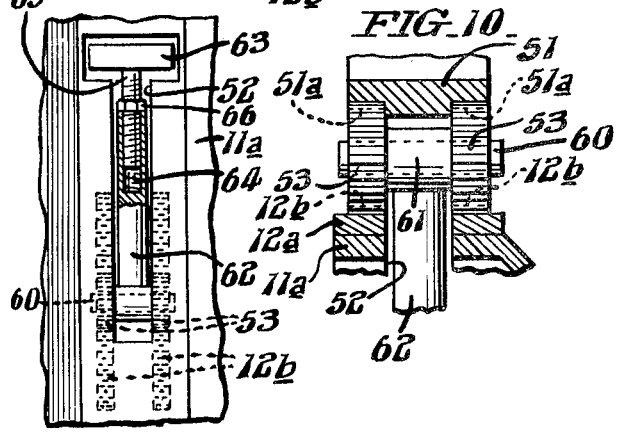
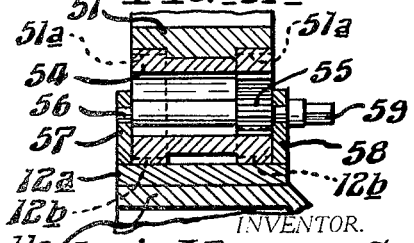

United States Patent Office 3,237,666
Patented Mar. 1, 1966

3,237,666
APPARATUS FOR INCREASING THE TRACTIVE
EFFECT OF A TIRE
Louis J. Damasco, Sr., 932 Marlyn Road,
Philadelphia, Pa.
Filed Jan. 21, 1965, Ser. No. 427,052
7 Claims. (Cl. 152—157)

This invention relates to apparatus for increasing the traction of tires. More particularly it relates to tractive apparatus which may be mounted within a vehicle tire in combination with means for selectively engaging or disengaging said apparatus at the will of the operator of the vehicle to which the tire is attached. More specifically my invention relates to a positive traction extensible link unit adapted to be operatively positioned within a tire casing.

Various devices have been proposed in the past for solving the problem of increasing the traction of the tires of automotive vehicles, particularly under conditions of rain, snow and ice. Such devices have included tire chains, cleats and the like for attachment to the tire. So-called snow tires are also used. Devices of this sort are directed to altering the external configuration or bearing surface of the tire and are subject to the disadvantage of creating a change in the surface of the tire which is an undesired modification when the road conditions return to normal. For instance, when the road surface is no longer covered with water, snow or ice, it becomes necessary to stop the vehicle and remove the chains or cleats, and for comfortable driving it becomes necessary to replace snow tires with fair weather tires.

One of the principal objects of the present invention is to provide apparatus which will increase the traction of a tire relative to a road surface without sensibly altering the external configuration or the bearing surface of the tire.

A further object of the present invention is to provide apparatus which will increase the traction of a tire relative to a road surface, which apparatus is adapted to be positioned within the tire casing.

A still further object of this invention is to provide apparatus for increasing the traction of a tire relative to a road surface which apparatus is mounted within the tire and affixed to the wheel disc and tire rim of the vehicle, and has associated means for engaging and disengaging, at the will of the driver, the tractive apparatus positioned within the tire casing.

A further object of the present invention is to provide apparatus for increasing the traction of a tire relative to a road surface which apparatus is positioned within the tire casing, having in combination therewith means for engaging and disengaging the tractive apparatus operable at will by the driver of the vehicle without the necessity of removing any of the apparatus from the tire.

A still further object of the present invention is to provide apparatus for increasing the traction of a tire relative to a road surface in which tractive apparatus for engaging the inner wall of the tire is mounted within the tire and has in combination therewith means for engaging and disengaging the tractive apparatus at the will of the driver of the vehicle without the necessity of bringing the vehicle to a stop.

Preferred means for achieving the above objectives are set forth in detail in the following description, having reference to the annexed drawings in which:

FIG. 1 is a side elevation view partly broken away to better illustrate the invention.

FIG. 2 is a sectional view taken along the lines II—II of FIG. 1.

FIG. 3 is an enlarged view partly in section and partly in elevation taken along the lines III—III of FIG. 2.

FIG. 4 is a view similar to FIG. 3 showing the retracted position of the operating mechanism comprising a part of the present invention.

FIG. 5 is an enlarged detail view of the structure included within the dot and dash rectangle designated as V on FIG. 2.

FIG. 6 is a schematic wiring diagram showing the switching circuit for the operating motors.

FIG. 7 is a side elevation view partly broken away of a modification of the invention.

FIG. 8 is a staggered section taken along the lines VIII—VIII of FIG. 7.

FIG. 9 is a partial section taken along the lines IX—IX of FIG. 8.

FIG. 10 is a sectional view taken along the lines X—X of FIG. 9.

FIG. 11 is a sectional view taken along the lines XI—XI of FIG. 9.

FIG. 12 is a plan view generally taken as indicated by the lines XII—XII on FIG. 8 with the operating mechanism in its retracted position.

*Apparatus*

In FIG. 1 there is shown a tire 10 of a type commonly designated as "tubeless" mounted on a rim 11 which is associated in the usual way with a wheel disc 12. The tractive apparatus of the present invention is shown generally as 1 in FIG. 1 at four equally spaced locations around the rim.

In FIG. 2 there is shown the relationship of the various vehicle parts relative to the tractive apparatus 1 in which the tire rim and wheel disc are shown at 11 and 12 respectively. The usual brake drum is shown at 13. Associated with brake drum 13 is brake backing plate 14. The usual axle housing 15, axle 16 and hub cap 17 are also shown in FIG. 2.

FIGS. 3 and 4 show the operative elements of the tractive apparatus of the present invention with its associated control mechanism. In these figures there is illustrated a reversing motor 18 which is mounted on rim 11 by means of the bracket 19. On the shaft 20 of the motor 18 there is a spur gear 21 which engages a second spur gear 22 attached to outer rotatable sleeve member 23. Sleeve 23 is secured to rim 11 and disc 12 by means of a hold-down collar 24 which has a threaded bore 25 for receiving threaded retaining bolt 26. Bearing 27 is mounted between the lower circumferential surface of collar 24 and the inner wall of sleeve 23 in order that sleeve 23 may freely rotate on operation of the gears 21 and 22 when motor 18 is activated. Extending upwardly from collar 24 and integral therewith is threaded extension 28 which is held in position at its upper end by means of a stop nut 29 which engages threaded stud 30 as shown. Guide pins 31 are provided in the wall of sleeve 23 for engagement with sleeve 32 as hereinafter described.

Inner sleeve 32 is provided with a bottom portion 33 having a threaded bore adapted to engage the threads of extension 28. Sleeve 32 also has a slot 35 adapted to engage the pins 31 so that sleeve 32 will rotate when sleeve 23 rotates. Toward the upper end of sleeve 32 internal threads 36 are provided for engagement with the threads 37 of adjusting nut 38. Lock nut 39 is provided for holding adjusting nut 38 in a selected fixed position. Tire engagement block 40 is mounted on the top surface of adjusting nut 38 by means of bolt 41 and is held in place by the nut 42. Bearing 43 is provided in order to permit easy rotation of the nut 38 relative to block 40. Block 40 is held against rotation by means of springs 44 and 45 which are affixed to block 40 and rim 11 as shown in FIGS. 1, 2 and 4.

Returning now to FIG. 2, there is indicated at V a portion of the apparatus enclosed within a generally rectangular dot and dash figure. The apparatus within this rectangle is the subject of the enlarged view of FIG. 5 in which there is shown a brush holder 46 and associated brushes 47 held in position by springs 48 and adjusting screws 49. Brushes 47 engage slip rings 50 which are electrically connected to the motor 18 through a switching circuit as shown in FIG. 6. Operation of the motor 18 may thus be controlled by the driver of the vehicle from the dashboard or other convenient location by operation of the switch 4 shown in FIG. 6.

In the circuit diagram of FIG. 6 there is shown diagrammatically a battery 2 and a switch 3 interposed between the battery and the brushes 47. Switch 3 is operated by the ignition switch of the vehicle in such a way as to be closed when the ignition is on and to be open when the ignition is off. Reversing switch 4 is a three-position, double-pole, double-throw switch interposed between the slip rings 50 and the motor 18. Switch 4 and motor 18 are constructed and connected in such a way as to provide a clockwise rotation of motor 18 in one position, counterclockwise rotation in the other position, and to deactivate the motor 18 when switch 4 is thrown to the central or middle position. Limit switch 5 is provided to energize a green light 6 when the traction apparatus is in the extended position shown in FIG. 3. Microswitch 7 is provided to activate red light 8 when the traction apparatus is in the retracted position shown in FIG. 4.

Turning now to FIGS. 7 to 12 inclusive, there is shown a modified form of the present invention in which extension and retraction of the tractive apparatus is accomplished entirely by mechanical means. In this form of the invention, wheel disc 12a is provided with gear teeth 12b and gear ring 51 is likewise provided with gear teeth 51a. Gear wheels 53 are mounted to engage gear teeth 12b and 51a, and a planetary gear 54 is mounted between rim 11a and ring 51 to engage teeth 12b and 51a. Drive gear 55 is mounted within planetary gear 54 and is provided with a shaft 56 which terminates in a squared-off end 59 adapted to receive an adjusting handle or wrench. Bearings 57 and 58 are provided for easy rotation of shaft 56.

As shown in FIG. 12, an opening in the form of a slot 52 is provided in rim 11a positioned to receive the stem 62 and engagement block 63 when the apparatus is moved to the retracted position. Stem 62 is mounted on shaft 60 to which there is affixed a pair of gear wheels 53. Spacer 61 is interposed between the paired gear wheels 53.

The stem 62 has internal threads 64 which receive the threads of bolt 65 carrying at its outer end the tire engagement block 63. Stop nut 66 is provided to hold the stem 62 and block 63 in the desired adjusted position.

Operation

The operation of the apparatus comprising the modification of FIGS. 1 to 6 inclusive will now be described. In fair weather driving conditions, the tractive apparatus 1 will normally be in the retracted position shown in FIG. 4. Therefore, microswitch 5 will be open and microswitch 7 will be closed causing light 6 to be off and light 8 to be on, provided switch 3 is closed, which will be the case if the vehicle is being driven since the car ignition switch will be on. In the event bad weather conditions are encountered, such as rain, snow or ice, the driver of the vehicle need only operate switch 4 causing motor 18 to be energized to drive gear 21 in the proper direction to rotate sleeve 23 in a counterclockwise direction and to thereby cause inner sleeve 32 to move upwardly over the threaded extension 28 to the position shown in FIG. 3. Rotation of sleeve 32 corresponds to the rotation imparted to sleeve 23 because of the engagement of pins 31 in slot 35, and therefore sleeve 32 moves in or out of sleeve 23 depending on the direction of rotation. When sleeve 32 reaches the extended position shown in FIG. 3, microswitch 5 closes and green light 6 goes on. The driver then returns switch 4 to the central or off position. Tire engagement block 40 is now in contact or near contact with the inner wall of tire 10. As soon as this occurs, the tire is given greatly increased traction with respect to the road surface every time the vehicle wheel rotates to a position in which the extended tractive apparatus 1 is resisting inwardly directed forces originating at the contact area between tire 1 and the road surface. Since the tire is depressed slightly at this point, the inner wall is forced firmly against the block 40. In the preferred embodiment of the invention, there are four tractive elements and, therefore, this effect takes place every 90° in the rotation of the wheel and its associated tire. The increased traction derived from the resolution of forces thus generated is surprisingly large and is repeated at short enough intervals to provide a continuity of driving traction even on very slippery surfaces. As soon as adverse road conditions are no longer present, the driver merely throws switch 4 to the retract position whereupon motor 18 is energized in a direction for rotating sleeve 23 in a clockwise direction causing sleeve 32 to move downwardly on stem 28 to the position shown in FIG. 4. When microswitch 7 moves to the closed position, light 8 comes on and the driver returns switch 4 to the off position.

In the embodiment shown in FIGS. 7 to 12 inclusive, the extension and retraction of the tractive elements is accomplished by stopping the vehicle and applying a suitable tool to the squared shaft end 59 shown in FIGS. 8 and 11. By turning shaft 56 in one direction, the tractive elements are rotated to the engaged position of FIG. 8. Turning the shafts the other direction rotates the tractive elements to the retracted position of FIG. 12. In this embodiment of the invention, it will be noted the tractive elements are swung through an arc. In the fully retracted position of FIG. 12 the tractive elements enter the slots 52 which are cut out of the upper surface of the rim. Rotation of the tractive elements is accomplished by the action of gear ring 51 and its associated teeth 51a on the paired gears 53.

The present invention has been described by reference to two preferred embodiments to enable those skilled in the art to understand and practice the invention. However, various modifications may be utilized without departing from the broader scope of the invention which is defined by the following claims.

Having thus described my invention, I claim:

1. A vehicle wheel and tire assembly comprising a wheel rim; a pneumatic tubeless tire mounted on said rim; spaced movable, rigid, traction members affixed to said rim and disposed within the space between said tire and said rim, said traction members normally being out of operative engagement with said tire; extension means mounted within the space between said tire and said rim and operatively engaging said rigid members for extension and retraction thereof; and activating means operatively engaging said extension means for extension of said rigid members to spaced apart positions proximate the inner wall of the tire, thereby increasing the traction of said tire through successive engagement of the inner wall of said tire with said rigid members on rotation of the vehicle tire and wheel assembly.

2. The apparatus of claim 1 in which the traction members are radially mounted on said rim within the tire.

3. The apparatus of claim 1 in which the traction members are pivotally mounted within the tire.

4. The apparatus of claim 1 in which said extension means includes a rotatable first sleeve, a fixed threaded element and a second sleeve in operative engagement with said fixed element and said first sleeve.

5. The vehicle and tire assembly of claim 1 further characterized by an electric motor mounted inside the tire and drive means interconnecting said motor and said traction members for extension and retraction thereof.

6. The invention of claim 5 further characterized by means for energizing said motor and a reversing switch remotely positioned from the wheel and tire assembly and connected in the circuit of said motor whereby said traction members are extended or retracted on operation of said reversing switch.

7. The apparatus of claim 6 further characterized by indicator light means in combination with means for energizing and de-energizing said indicator light means on extending or contracting said traction members.

References Cited by the Examiner

UNITED STATES PATENTS

| | | | |
|---|---|---|---|
| 1,276,902 | 8/1918 | Gormley | 264—103 |
| 1,514,120 | 11/1924 | Alters | 254—103 |
| 2,190,117 | 2/1940 | Griffith | 152—415 |
| 2,775,282 | 12/1956 | Kennedy | 152—158 |
| 2,941,565 | 6/1960 | Rusch et al. | 152—158 |

EUGENE G. BOTZ, *Primary Examiner.*

ARTHUR L. LA POINT, *Examiner.*

C. W. HAEFELE, *Assistant Examiner.*